United States Patent
Wybenga

Patent Number: 6,068,462
Date of Patent: May 30, 2000

[54] APPARATUS FOR CONTINUOUSLY FORMING A BLOWN FILM

[75] Inventor: William J. Wybenga, Brampton, Canada

[73] Assignee: Brampton Engineering, Inc., Brampton, Canada

[21] Appl. No.: 08/982,518

[22] Filed: Dec. 2, 1997

[51] Int. Cl.[7] .................................................. B29C 47/90
[52] U.S. Cl. ..................... 425/72.1; 425/326.1; 425/377; 425/392
[58] Field of Search ................................ 425/72.1, 133.1, 425/326.1, 387.1, 392, 377, 380, 461, 467; 264/564

[56] References Cited

U.S. PATENT DOCUMENTS

| | | | |
|---|---|---|---|
| 3,577,488 | 5/1971 | Bigland | 425/72.1 |
| 3,957,566 | 5/1976 | Rahlfs | 425/133.1 |
| 4,080,143 | 3/1978 | Upmeier | 425/72.1 |
| 4,105,380 | 8/1978 | Zimmermann | 425/72.1 |
| 4,473,527 | 9/1984 | Fujisaki et al. | 425/72.1 |
| 4,846,645 | 7/1989 | Cole | 425/72.1 |

FOREIGN PATENT DOCUMENTS

| | | |
|---|---|---|
| 1 147 418 | 4/1969 | United Kingdom . |
| 2 289 645 | 11/1995 | United Kingdom . |

Primary Examiner—Harold Pyon
Assistant Examiner—Joseph Leyson
Attorney, Agent, or Firm—Riches, McKenzie & Herbert

[57] ABSTRACT

An apparatus is used in the continuous extrusion of blown films which includes a die suitable for use in forming a blown film bubble, and one or more primary gas outlets for use in stretching and drawing the extruded film prior to it stabilizing. The primary gas outlets direct cooling gas streams on the interior and/or exterior surface of an unstabilized portion of the blown film bubble as it emerges from the die. Secondary cooling gas outlets are also provided to introduce secondary gas streams into an upper stabilized portion of the blown film bubble above the bubble frost line. An exhaust conduit in gaseous communication with an interior of the bubble is used to maintain the gas pressure in the blown film bubble interior at a desired pressure. The exhaust inlet is located at a position adjacent the bubble frost line spaced away from the primary cooling gas outlets and marginally towards the secondary gas outlet.

15 Claims, 4 Drawing Sheets

APPARATUS FOR CONTINUOUSLY FORMING A BLOWN FILM

SCOPE OF THE INVENTION

The present invention relates to an apparatus and method of continuously forming a blown film, and more particularly, an apparatus which provides improved internal film bubble conditioning to permit increased rates of film production and minimize film block as the film bubble is nipped and the film is collected.

BACKGROUND OF THE INVENTION

The continuous extrusion and production of blown film bubbles in the manufacture of films is well known. Thin films are formed by extruding the desired film composition as a hot melt through a die, while stretching the extruded melt by directing cooling air currents thereon. The melt composition is extruded in the form of a tube, which is drawn by the cooling air flow and nipped at a desired length to form a cylindrical bubble. As the film bubble forms, the polymer cools as it emerges from the die until the polymer achieves sufficient melt strength to stabilize the bubble and prevent its further expansion. The point from the die at which the blown film bubble cools sufficiently to pass from an unstabilized state, where the bubble may be expanded, to where the blown film bubble stabilizes is referred to as the frost line. Once the film bubble has cooled, the bubble is then collapsed at a desired point by nip rollers, and the film is wound onto a spool or the like. The film is thus formed by continuously producing the blown film bubble by simultaneously extruding the melt from the die, directing air currents over the softened and unstable portion of the film at a sufficient air velocity to draw and stretch the film into the bubble having a uniform and constant thickness, while nipping the cooled stabilize portion of the film bubble.

Typically blown films are formed from polymer resins which include one or more of low and high density polyethylene or other thermoplastics. Depending upon the composition and the production rate of the film, the stabilized portion of the blown film bubble may have an elongated length of between 2 to more than 20 meters. Similarly, the diameter of the blown film bubble may vary from only a few centimeters to several meters or more, depending on the intended film applications.

To increase the rate at which the bubble reaches a point of stabilization at the frost line, and thereby increase film production rates, U.S. Pat. No. 4,846,645 to Cole discloses one known bubble forming apparatus. In the apparatus of Cole, the bubble is formed by directing cooling air streams simultaneously on both interior and exterior unstabilized surfaces of the film bubble as the film emerges from the die. It has been found, however, that when the film is produced at very rapid production rates, the film may have cooled insufficiently as it moves through the nip rollers. If this occurs, on pressing the film bubble flat, the nip rollers may cause the film to stick to itself or "block".

The problem of blocking is particularly acute where larger blown thin film bubbles are produced and/or where the blown film bubble is extruded upwardly as a vertically elongated bubble. In particular, it has been found that a pocket of stagnant hot air may form towards the upper area of the bubble, adjacent the area of the apparatus where the film is collapsed by nip rollers. As production rates for the film increase, there exists a corresponding increase in the temperature of the hot air which, if hot enough, may re-heat the film, causing it to stick to itself or block, when the bubble is collapsed and squeezed by the nip rollers.

SUMMARY OF THE INVENTION

The present invention overcomes at least some of the disadvantages of prior art film manufacturing systems by providing an apparatus for continuously forming a blown film bubble, which introduces a cooling air stream into an upper interior area of the film bubble to displace any stagnant hot gases which may accumulate therein.

Another object of the invention is to provide an apparatus for use in the continuous extrusion of a blown film which allows higher production rates on films that are prone to blocking.

Another object of the invention is to provide a blown film forming apparatus which in use, circulates gases within the formed blown film bubble to substantially eliminate from within the bubble any pockets of stagnant hot air.

A further object of the invention is to provide a method of manufacturing a film in a continuous process which minimizes the likelihood that the film will block during nipping operations.

A further object of the invention is to provide an apparatus for use in the continuous production of a blown film which achieves more rapid cooling and improved physical properties of the film.

Another object of the invention is to provide an apparatus used in the production of blown films in which the stabilized film is partially warmed as it is nipped, to minimize film wrinkling as it passes through nip rollers.

The applicant has appreciated an improved apparatus used in the continuous extrusion of blown films. The apparatus includes a die suitable for use in forming a blown film bubble, and one or more primary gas outlets for use in stretching and drawing the extruded film prior to it stabilizing. The primary gas outlets direct at least one primary cooling gas stream on the interior and/or exterior surface of an unstabilized portion of the blown film bubble as it emerges from the die, to stretch and draw the film into the bubble having the desired film thickness. The apparatus further includes one or more secondary gas outlets configured to provide at least one stream of secondary warming or cooling gas into a stabilized portion of the blown film bubble past the frost line, and an exhaust conduit which is in gaseous communication with an interior of the bubble to maintain the gas pressure in the blown film bubble interior at a desired pressure.

In a simplified embodiment, the exhaust conduit is open to the bubble interior at one or more exhaust inlet ports through which cooling gases which have been introduced into the bubble may be evacuated. The exhaust inlet ports may be located almost anywhere within the bubble, but preferably are positioned either at the bubble frost line or part way between the frost line and the secondary gas outlets. Most preferably, the exhaust inlet ports are located at a position adjacent the bubble frost line spaced away from the primary cooling gas outlets and marginally towards the secondary gas outlets.

Gases may be evacuated from the bubble interior via the exhaust inlet ports and exhaust conduit at substantially the same rate as gas is injected therein, so as to maintain the interior pressure of the bubble substantially in equilibrium with a preferred pressure. The gas stream from the secondary gas outlet may be either a cooling gas stream, used to cool and prevent blocking of the film bubble as it is nipped, or where thicker films are to be produced, a warming gas stream used to increase flexibility of the film and reduce wrinkling of the film.

Where a cooling gas is used, it is most preferably air which may be at either atmospheric temperature, or which is artificially lowered by passing through a refrigeration or pre-chilling unit to a temperature of about 15° C. or less. It is to be appreciated, however, that depending upon the film to be produced and the composition of the hot melt, other reactive and non-reactive gases could be used to cool the film, including by way of non-limiting examples, oxygen, nitrogen, helium, neon and argon, to name but a few.

The present invention is suitable for use in the continuous extrusion of numerous types of blown films which, depending upon the physical properties of the film desired, may be formed by extruding the desired polymer composition melt from the die. Compositions particularly suited for use with the present invention would include in various combinations nylon, high and low density polyethylene, rubbers, ethylene vinyl acetate, and other thermoplastic materials, either with or without additional additives.

Accordingly, in one aspect the present invention resides in an apparatus for use in the continuous extrusion of a blown film comprising, a die suitable for forming a blown film bubble, said bubble characterized by a frost line separating an unstabilized portion of said bubble adjacent said die wherein said film remains in an expandable state, and a stabilized portion of said bubble wherein said film remains in a substantially non-expandable state, at least one first air outlet for directing a first stream of cooling air along a surface of the film as said film emerges from the die, collapsing means for collapsing the blown film bubble, said collapsing means positioned so as to be spaced from said frost line in a direction away from the die, air exhaust means for exhausting air from within the blown film bubble, the air exhaust means including an exhaust inlet positioned for placement within said bubble at a location intermediate said frost line and said collapsing means, a second air outlet for providing a second stream of air into said stabilized portion of said blown film bubble at a location between said exhaust inlet and said collapsing means, and air supply means for supplying air to said first air outlet and said second air outlet.

In another aspect, the present invention resides in a method of using an apparatus to continuously form a blown film, said apparatus including, a die suitable for forming a blown film bubble, said bubble characterized by a frost line separating an unstabilized expandable portion immediately adjacent said die and a stabilized substantially non-expandable portion, a film collapsing apparatus spaced from said die for collapsing the blown film bubble, a first air outlet for directing a first stream of cooling air along a surface of the blown film as it emerges from the die, air exhaust means for exhausting air from within the blown film bubble, the air exhaust means including an exhaust inlet located intermediate said frost line and said collapsing means, and a second cooling air stream outlet for providing a second stream of cooling air into said blown film bubble at a location spaced a distance from the exhaust inlet towards said collapsing means, wherein said film is formed by the steps of:
(a) continuously extruding said film bubble from said die,
(b) simultaneously while film bubble is extruded, directing said first air stream along said unstabilized portion of said bubble at a location between said die and said frost line to draw the blown film to a desired thickness,
(c) while the film bubble is extruded, introducing the second stream of cooling air into said stabilized portion of said bubble at a location between said frost line and said collapsing apparatus,
(d) operating the exhaust means to exhaust air from within the film bubble via the exhaust inlet, and
(e) operating the collapsing apparatus to collapse a portion of the film bubble.

In a further aspect, the present invention resides in an apparatus for use in the continuous extrusion of blown films comprising, a die suitable for forming a vertically elongated blown film bubble, a collapsing apparatus spaced vertically from said die, the collapsing apparatus including at least one pair of nip rollers for collapsing and substantially sealing an uppermost end of the blown film bubble, a primary gas outlet for directing a first stream of cooling gas along a surface of the blown film as it emerges from the die, a secondary gas outlet spaced vertically from the primary gas outlet for providing a secondary stream of gas into an upper portion of the blown film bubble, a gas exhaust apparatus for exhausting gas from within the blown film bubble, the gas exhaust apparatus including an exhaust inlet positioned within said blown film bubble spaced vertically above the primary gas outlet and below the secondary gas outlet.

BRIEF DESCRIPTION OF THE DRAWINGS

Further objects and advantages of the invention will appear from the following description taken together with the accompanying drawings in which.

DETAILED DESCRIPTION OF THE INVENTION

Figure 1:
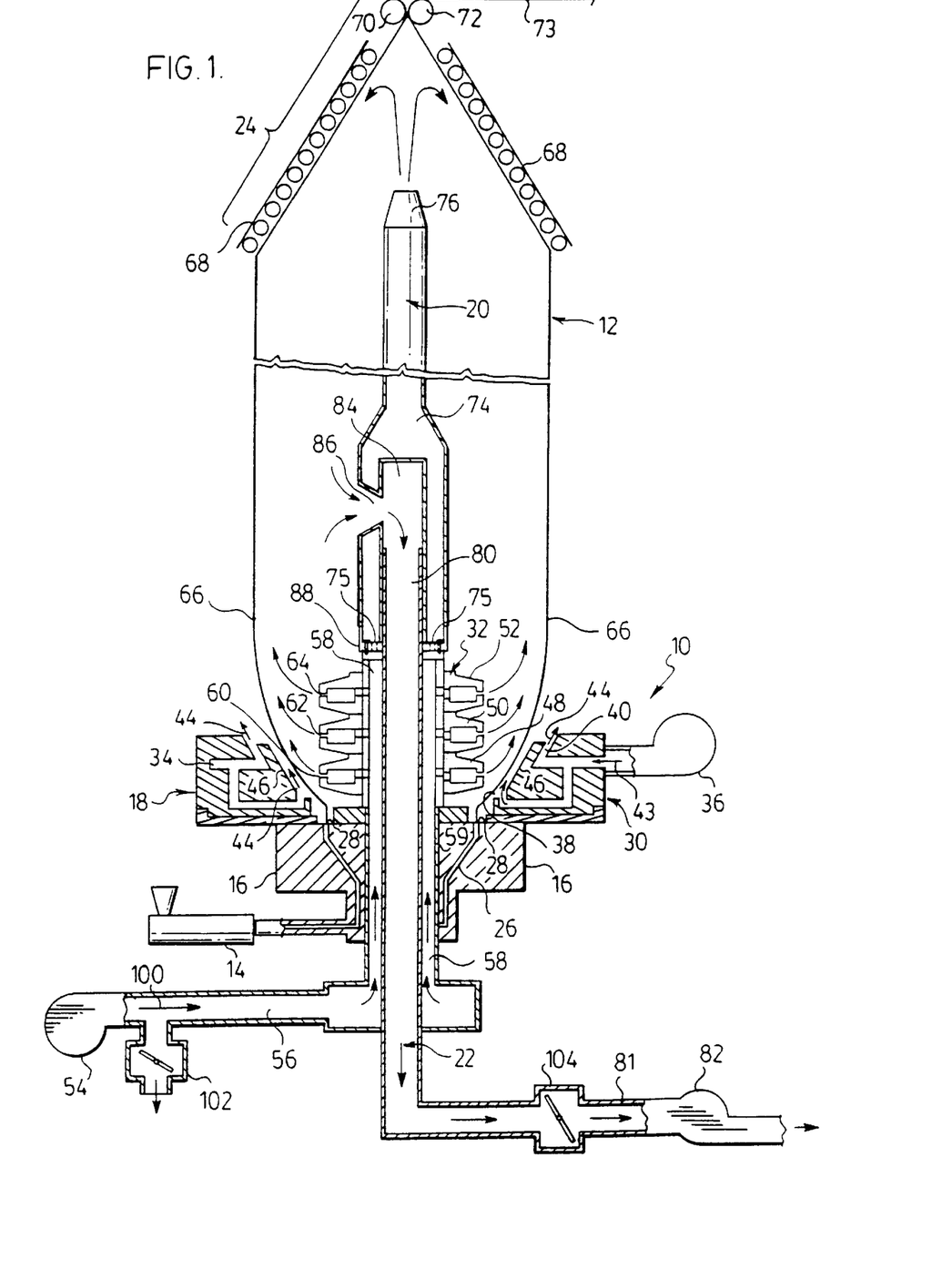
FIG. 1 shows a schematic side view of an apparatus used in the continuous formation of blown films in accordance with a preferred embodiment of the invention.

FIG. 1 shows best an apparatus 10 which is used in the continuous formation of a vertically elongated long stock blown film bubble 12, which extends to a length of 10 meters or more. The apparatus 10 includes a polymer supply reservoir 14, a die 16 suitable to form the bubble 12, a primary bubble stabilizing cooling assembly 18 positioned immediately above the die 16, a secondary bubble cooling assembly 20, a cooling gas exhaust assembly 22, and a bubble collapsing assembly 24.

In the apparatus 10, a desired film resin composition melt (ie. polyethylene) is supplied from the polymer supply reservoir 14 to the die 16. FIG. 1 shows the die 16 best as defining a generally bowl-shaped melt passage 26 which opens to an uppermost ring-shaped opening 28. With this configuration, the melted polymer resin is continuously pumped from the reservoir 14 into the bottom of the die 16, where it flows upwardly through the melt passage 26. As the melted polymer is pumped into the die 16, a thin film tube 29 (FIG. 2) is initially extruded from the upper ring shaped opening 28, adjacent the cooling assembly 18.

The bubble stabilizing cooling assembly 18 provides primary cooling air flow to the film 12 as it first emerges from the die 16 in a softened unstabilized and expandable state. The cooling assembly 18 is shown as consisting of an external cooling ring assembly 30 for providing a first primary stream of cooling air flow along an external peripheral surface of the bubble 12, and an internal cooling ring assembly 32 for providing a second primary stream of cooling air flow along an internal surface of the bubble. Both the external cooling ring assembly 30 and the internal cooling ring assembly 32 are positioned in the apparatus 10 so that in use, each will direct a stream of cooling air on respective exterior and interior surfaces of the unstabilized, expandable portion of the blown film bubble 12.

FIG. 1 shows best the external cooling ring assembly 30 as including an internal air flow passage 34 which is provided in gaseous communication with an air blower 36. The cooling ring assembly 30 is further preferably a dual-lip type, wherein the air flow passage 34 opens into a pair of spaced radially extending annular cooling gas outlets 38,40. The cooling gas outlet 40 has a larger radial diameter than cooling gas outlet 38, and is spaced vertically thereabove. Each of the cooling gas outlets 38,40 are oriented so that air from the blower 36 moves along the passage 34 in the direction of arrow 43 and through radially spaced ring air outlets 38,40 in the direction of arrows 44. The external cooling ring assembly 30 is further provided with a contoured surface 46 spaced from the path of travel of the film bubble 12 as it emerges from the die 16. The cooling air stream from the cooling gas outlet 38 flows along and is guided by the contoured surface 46 to assist in forming the bubble 12 with the desired shape. It is to be appreciated, however, that the cooling ring assembly 30 need not be of a dual air lip type and that other configurations are also possible.

Figure 2:
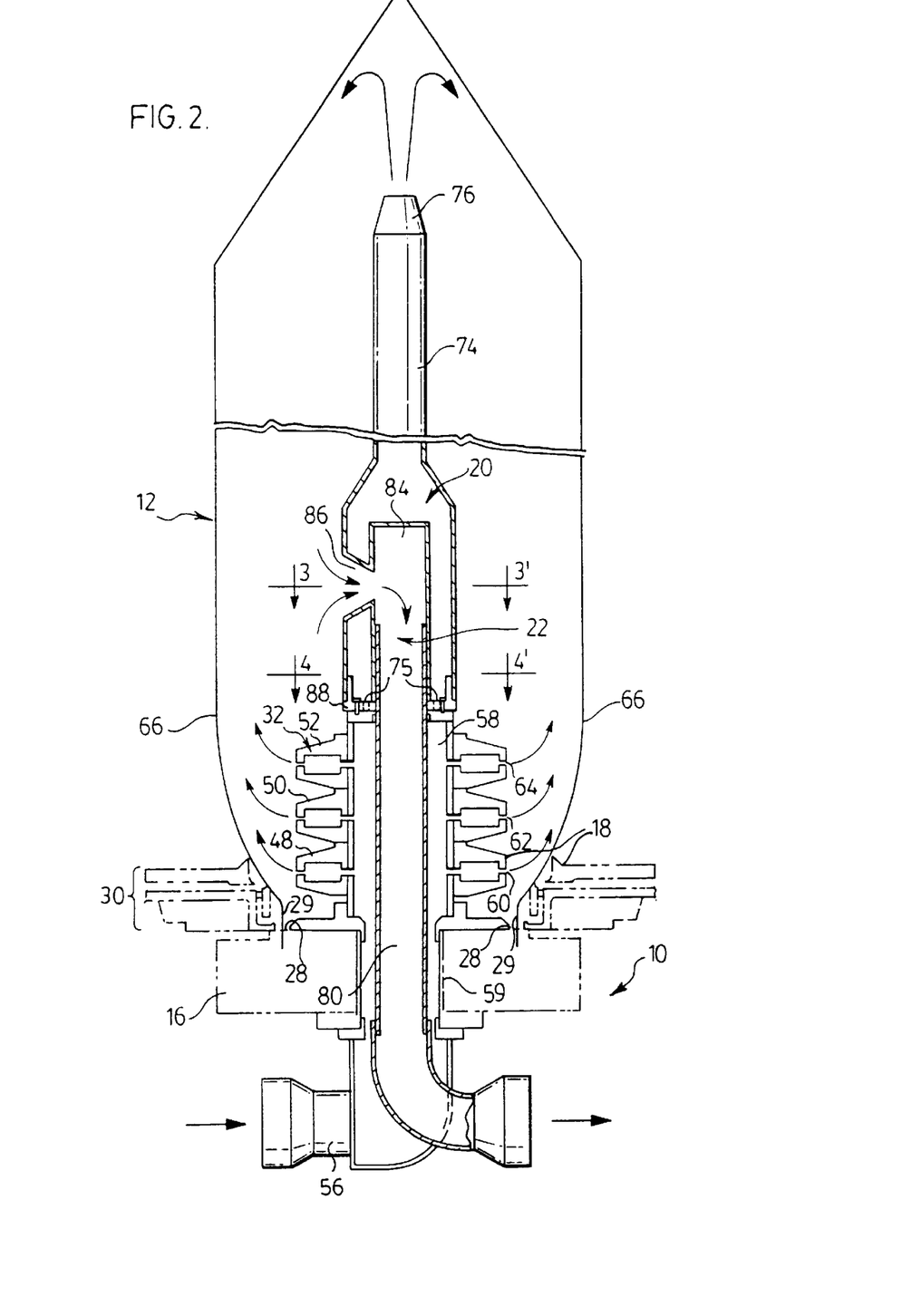
FIG. 2 shows an enlarged schematic side view of the gas exhaust system and internal cooling assemblies used in the apparatus shown in FIG. 1.

As shown best in FIGS. 1 and 2, the internal cooling ring assembly 32 consists of three vertically stacked air rings 48,50,52. Each of the air rings 48,50,52 are provided in gaseous communication with a blower 54 via an external supply line 56 and an axial conduit 58. The conduit 58 extends vertically through a bore 59 formed through the die 16 at a position axially centered within the melt passage 26. The air rings 48,50,52 extend radially outwardly from the conduit 58 towards the inner surface of the formed bubble 12. The rings 48,50,52 are each open to the conduit 58 along their radially inwardmost edges to permit air flow from the conduit 58 therein. The rings 48,50,52 open at their radially outermost peripheral edges into annular air outlets 60,62,64, respectively, thereby permitting the flow of cooling air streams from the blower 54, along the supply line 56 and conduit 58, and through the air rings 48,50,52 into an interior of the bubble 12.

The gas supply outlets 38,40 of the external cooling ring assembly 30 and the air outlets 60,62,64 of the internal cooling ring assembly 32 are oriented so as to direct streams of cooling gas flow in the direction of bubble formation. The external cooling ring assembly 30 and internal cooling ring assembly 32 are positioned so that the primary streams of cooling air emitted therefrom stretch and draw the unstabilized portion of the film bubble 12 outwardly until the film achieves the desired thickness. In particular, the primary streams of cooling air are directed along the film bubble 12 as it emerges from the die 16, and before the film 12 has emerged to a point where it reaches the bubble frost line 66, namely the point where the polymer cools to such an extent that the bubble 12 changes from an unstabilized expandable state to a stabilized substantially non-expandable state.

In the preferred embodiment shown in FIG. 1, the bubble collapsing assembly 24 is spaced directly above the die 16 at the desired height which is selected to define the uppermost extent of the bubble 12. The collapsing assembly 24 includes a pair of upwardly inward tapering roller conveyors 68 and two cylindrical nip rollers 70,72. The nip rollers 70,72 are positioned so as to contact each other along their length, and consist of a rubber and perforated metal roller, respectively. The nip rollers 70,72 close off and collapse the sides of the film bubble 12 together, substantially preventing the movement of air from within the bubble 12 from moving therebetween. The nip rollers 70,72 collapse the film bubble 12 at substantially the same rate as the bubble 12 is continuously formed. Once the film bubble 12 is collapsed, the flattened film 73 which emerges from between the rollers 70,72 is continuously wound on storage roll spools (not shown) or the like.

FIGS. 1 to 4 show best the secondary bubble cooling assembly 20 which is used to cool the upper interior portion of the bubble 12, and prevent the flattened film 73 from blocking as the bubble 12 is nipped by the rollers 70,72. The secondary bubble cooling assembly 20 is provided in a generally vertical orientation in a central portion of the blown film bubble 12. The secondary bubble cooling assembly 20 includes a secondary cooling gas conduit tube 74 which opens at its uppermost end to a secondary cooling gas outlet 76. The tube 74 comprises a steel cylindrical tube extending upwardly from an opening in the top of the axial conduit 58 substantially the vertical height of the bubble 12. The length of the conduit tube 74 is selected so that secondary cooling gas outlet 76 locates at a position within the lowermost extent of the bubble collapsing assembly 24 between the roller conveyors 68. As will be described hereafter, the lower end of the conduit tube 74 is open and is in gaseous communication with the gas conduit 58 through a series of circular apertures 75.

To avoid over pressures within the blown film bubble 12 during its formation, cooling air introduced through the internal cooling ring assembly 32 and secondary cooling gas conduit tube 74 is evacuated from the interior of the bubble 12 by the exhaust assembly 22. FIG. 1 shows the exhaust assembly 22 as including an exhaust conduit 80 which is provided in gaseous communication with an exhaust line 81 and exhaust blower 82 external to the formed blown film bubble 12. FIG. 2 shows best the conduit 80 as extending coaxially through the bore 59 in the die 16 to an uppermost end 84 positioned in the lower portion of the secondary cooling gas conduit tube 74. The conduit 80 has a radial diameter smaller than that of the tube 58 and tube 74. The conduit 80 is provided in a vertical co-axial orientation within conduit tube 58 and the secondary cooling gas conduit tube 74. As seen best in FIGS. 2 and 3, a series of radially spaced exhaust gas inlet ports 86 are provided through a lower portion of the cooling tube 74 providing gaseous communication between the interior of the bubble 12 and the upper end 84 of the exhaust conduit 80. Exhaust inlet ports 86 are spaced vertically above the bubble frost line 66 and towards the secondary cooling gas outlet 76 and permit cooling gases to be evacuated from within the interior of the bubble 12 via the exhaust conduit 80 and exhaust line 81, by means of the blower 82.

Figure 3:
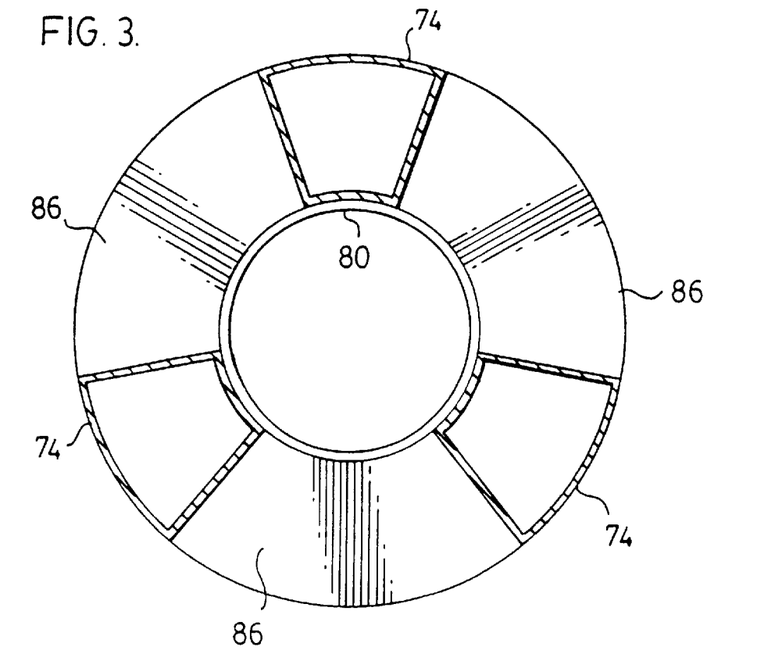
FIG. 3 shows an enlarged cross-sectional view of a secondary cooling gas conduit tube and exhaust conduit inlet ports of the apparatus shown in FIG. 2 taken along line 3-3'.

The exhaust inlet ports 86 preferably extend through the tube 74 at a location spaced towards a lower portion of the formed bubble 12. Most preferably, the exhaust ports 86 are positioned at a location spaced marginally above the bubble frost line 66. With this configuration, the secondary cooling air which is emitted through the outlet 76 at the top of the bubble 12 circulates downwardly to the exhaust inlet ports 86. The circulating air flow within the bubble 12 eliminates the prior art disadvantages of stagnant hot air accumulating at the top of the bubble 12 where it may otherwise reheat the film 12, and cause blocking as the film is pinched between the nip rollers 70,72.

Figure 4:
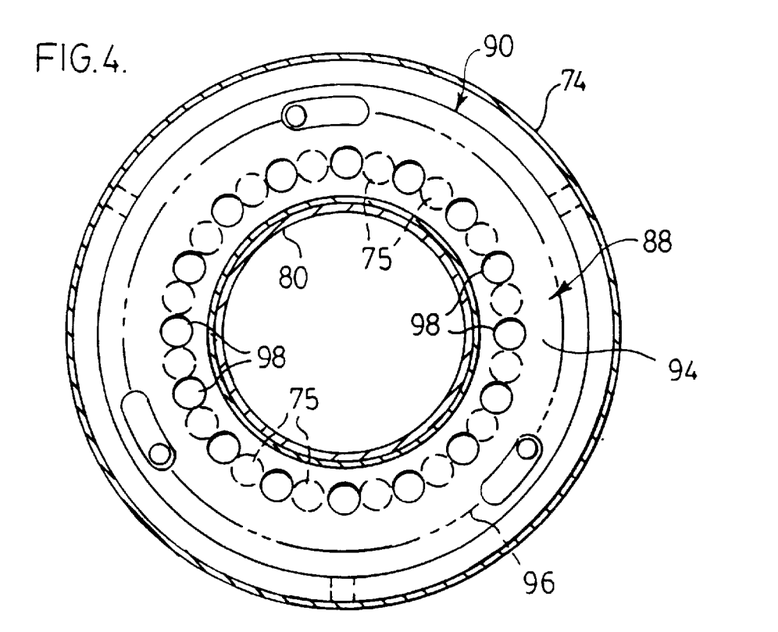
FIG. 4 shows an enlarged cross-sectional view of an air flow valve used to regulate gas flow into the secondary cooling gas conduit tube shown in FIG. 2 taken along line 4-4'.

As shown best in FIGS. 2 and 4, a spoke valve 88 is positioned across the lowermost end of conduit tube 74 to regulate the cooling air flow through apertures 75 (shown in phantom in FIG. 4) and along the tube 74. The valve 88 consists of a fixed ring-shaped plate 90 which is secured in a position spanning between the bottom open end of the conduit tube 74 and the exhaust conduit 80 which is positioned co-axially therein. FIG. 4 shows apertures 75 as extending through the plate 90 at radially spaced locations. When the valve is open, the apertures 75 permit air flow from the conduit 58, upwardly along the tube 74 and outwardly into the blown film bubble 12 via the outlet 76. To regulate air flow, a second ring-shaped plate 94 which is rotatably coupled to the plate 90 by an annular bearing ring 96 is rotated about the conduit 80. The plate 94 includes a corresponding number of apertures 98 which have a similar shape and spacing to the apertures 75 which are formed through the plate 90.

In a simplest embodiment, the operation of the valve 88 is achieved by manually rotating the plate 94 relative to the plate 90. In this manner, the valve 88 may be closed to restrict the flow of cooling air flow from the outlet 76 by rotating the plate 94 to move the series of apertures 98 and 75 out of alignment. Where increased secondary cooling is desired, the plate 94 is rotated so that apertures 98 and 75 are aligned, to permit substantially unhindered air flow through the valve 88 and into the conduit tube 74.

FIG. 1 shows best the supply of cooling air for the internal cooling ring assembly 32 and the secondary cooling gas conduit tube 74. The blower 54 is used to force air in the direction of arrow 100 along the supply line 56 and upwardly through the axially aligned gas conduit 58. Depending on the positioning of the valve 88, the air from the conduit 58 then flows into the bubble 12 as separate air flow streams emanating from the primary air outlets 60,62, 64 and/or the secondary gas outlet 76. The internal cooling assembly ring 32 provides air streams which achieve primary cooling of the extruded film bubble 12 as the film initially emerges from the die 16. To cool the uppermost portion of the bubble 12, the secondary flow of cooling gas is provided upwardly past the valve 88, along the conduit tube 74 and outwardly via the cooling gas outlet 76.

The volume of air flow from the internal cooling assembly 32 and the secondary cooling gas outlet 76 is regulated by rotating the spoke valve 88 to adjust the alignment of the openings 75,98 between the conduit 58 and the open lower end of the conduit tube 74. In this manner, the volume of air flow for internal primary cooling may be increased by closing the valve 88 to increase the rate of air flow through the rings 48,50,52 and from outlets 60,62,64. Conversely, the valve 88 may be opened to decrease the volume of air flow for internal primary cooling, permitting air flow through the outlet 76 and into the upper stabilized portion of the bubble 12. An external valve 102 (FIG. 1) may further be provided externally from the formed film bubble 12 to regulate overall air flow along the supply line 56 and into the conduit 58, (as well as from the primary gas outlets 60,62,64 of the internal cooling rings 48,50,52 and the secondary cooling gas outlet 76). It is to be appreciated that the blowers 54,82 are operated so as to maintain the air pressure within the bubble 12 substantially in equilibrium, and most preferably at a pressure slightly above atmospheric pressure. Although not essential, to further assist in the regulation of the air flow into and from the bubble 12, a second valve 104 may be provided along the exhaust line 81.

In the use of the apparatus 10, the polymer resin is continuously fed from the reservoir 14 to the melt passage 26 of die 16. As resin is fed into the die 16, it moves upwardly through the cylindrical melt passage 26 and is extruded from the upper ring shaped opening 18 as an initially cylindrical tube 29. Depending upon the polymer resin composition, the temperature of the extruded polymer film 12 immediately after it emerges from the die 16 will typically range between about 180° C. and 350° C. As the film emerges from the die 16, it is continuously blown by cooling air streams from the cooling ring assemblies 30,32 to form the film bubble 12. As the extruded film 12 is blown, primary cooling air streams from the outlets 38,40,60,62,64 on the unstabilized portion of the bubble 12, cause the molten polymer to stretch and the bubble 12 to expand. The air outlets 38,40,60,62,64 direct primary streams of cooling air along both opposing interior and exterior surfaces of the film 12 as it emerges from the die 16. The air flows from the primary air outlets 38,40 create vacuum forces which draw the extruded polymer tube outwardly while simultaneously cooling the stretched film 12. The air flows from the air outlets 60,62,64 provide primary cooling to more rapidly stabilize the bubble 12. Once the polymer which form the blown film bubble 12 cools sufficiently to stabilize, (as marked by the frost line 66 where the bubble 12 achieves a stable cylindrical diameter), the film 12 having the desired thickness and physical properties is achieved.

The continuous extrusion of the polymer from the die 16 results in the continuous upward movement of the sides of the bubble 12 into the collapsing assembly 24, where the upper end of the bubble 12 is collapsed by the nip rollers 70,72. As the blown film bubble 12 is continuously formed and nipped by the rollers 70,72, secondary cooling air is introduced into the bubble 12 via the gas conduit tube 74 and secondary cooling gas outlet 76. By locating the outlet 76 between the roller conveyors 68 and the exhaust inlet ports 86 therebelow, the secondary air flow causes the downward circulation of cooling air within the bubble 12 from the outlet 76 towards the exhaust inlet ports 86. The downward circulation of cooling air in turn displaces any stagnant hot air which may otherwise accumulate within the upper portion of the bubble 12 adjacent the nip rollers 70,72.

The preferred embodiment of the invention discloses the use of a blower 54, gas supply line 56 and conduit 58 as a single cooling air supply for both the secondary cooling gas outlet 76 and the primary internal cooling ring assembly 32. This has the advantage of reducing the overall manufacturing costs of the apparatus 10. If a chiller (not shown) is included to lower the temperature of the cooling air, a separate blower system could add several thousands of dollars to the overall manufacturing costs of the apparatus 10. It is to be appreciated, however, that air flow to the secondary gas conduit tube 74 and outlet 76 could be provided independently from the air flow to the internal cooling ring assembly 32.

It is also envisioned that additives may be entrained in the cooling gas stream emitted by the secondary cooling gas outlet 76 which further enhance anti-block properties of the film 12. Possible additives may, for example, include either ionized particles, or powders such as cornstarch, to prevent the sides of the blown film bubble 12 from blocking as it is nipped by the nip rollers 70,72.

Figure 5:
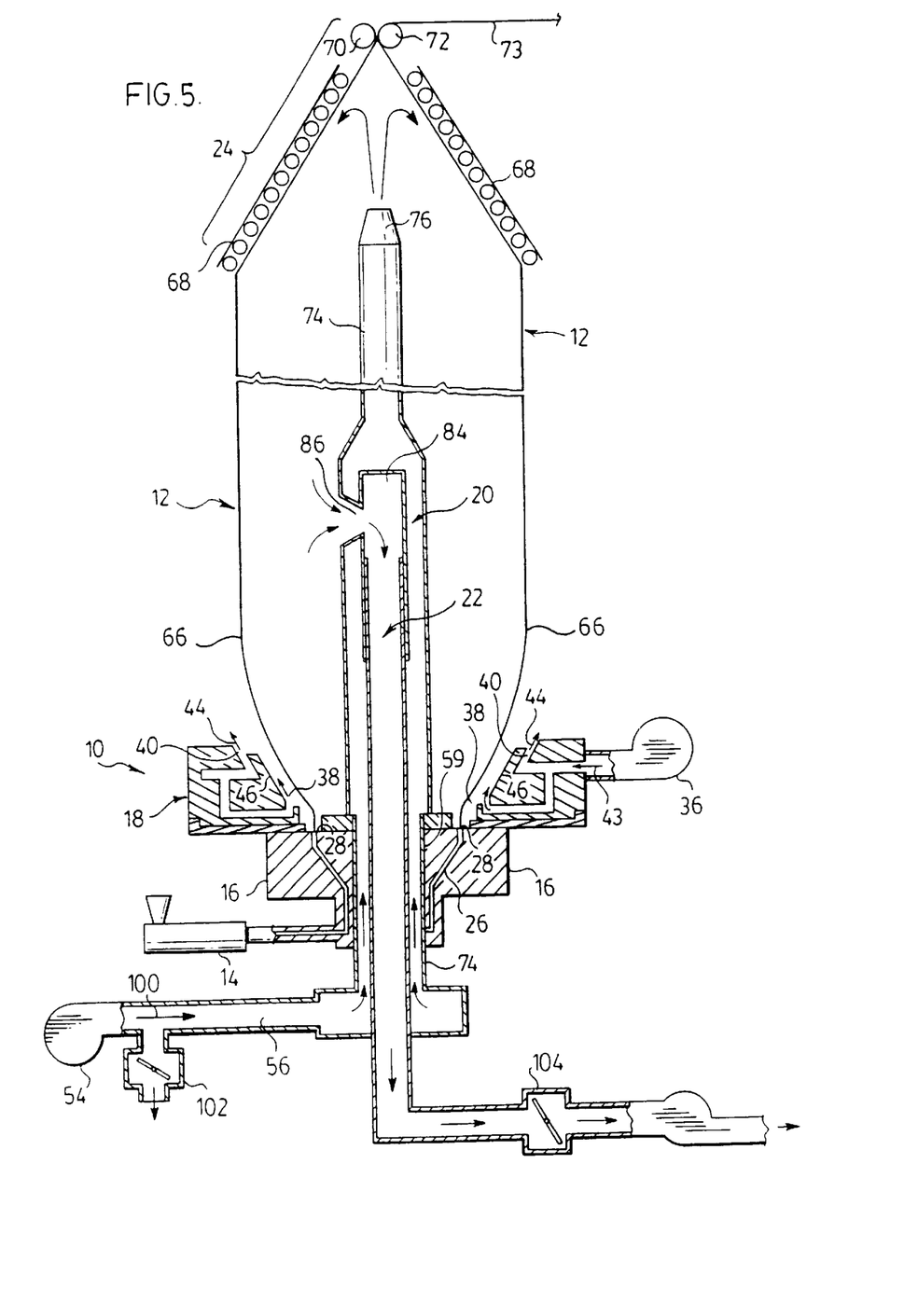
FIG. 5 shows a schematic side view of an apparatus used in the continuous formation of blown films in accordance with a second embodiment of the invention.

Although FIGS. 1 to 4 illustrate the apparatus 10 as having both an external cooling ring assembly 30 and an internal cooling ring assembly 32, the invention is not so limited. If desired, the apparatus 10 could include either a single external or a single internal primary cooling assembly used to form the bubble 12 without departing from the present invention. FIG. 5 illustrates one such embodiment of the apparatus 10 wherein the internal cooling ring assembly 32 shown in FIG. 1 is omitted, and wherein like references are used to identify like components.

In the embodiment shown in FIG. 5, the secondary cooling gas conduit tube 74 consists of a vertically positioned cylindrical steel or aluminum tube which extends through the bore 59 and is in gaseous communication directly with the supply line 56. The conduit tube 74 opens at its uppermost end into an air outlet 76. As with the embodiment described with reference to FIG. 1, the outlet 76 is positioned above both the frost line 66 of the bubble 12, and the exhaust inlet ports 86 which leads into the exhaust conduit 80. Preferably, the outlet 76 is located towards an upper portion of the bubble 12, and more preferably, is positioned at a height spaced near or adjacent to the bubble collapsing assembly 24. With this configuration, cooling air moves from the blower 54 via the gas supply line 56 and directly into the bottom open end of the secondary gas conduit tube 74. Because there is no need to regulate gas flow into an internal cooling ring assembly, the spoke valve 88 shown in FIG. 4 is not required. The flow of gas through the tube 74 and from the outlet 76 can thereby be regulated by the valve 102 positioned externally from the formed bubble 12.

Accordingly, in the apparatus of FIG. 5, the air flow through the secondary cooling tube 74 and outlet 76 need only be equalized with the air flow through the exhaust conduit 80, permitting more simplified set up and calibration of the apparatus 10.

The operation of the invention 10 shown in FIG. 5 is performed in essentially the identical manner as that in FIG. 1 with the exception that there is no primary cooling of the unstabilized portion of the internal surface of the bubble 12, as the film is extruded from the die 16. Primary cooling of the film 12 is performed with the blower 36 continuously operating, so that cooling air streams from the cooling ring assembly 30 draw and stretch unstabilized portion of the bubble 12 to the desired thickness. The blower 54 is operated to supply secondary cooling air flow to the interior of the bubble 12 via the supply line 56, conduit tube 74 and outlet 76. Simultaneously, the exhaust blower 82 is operated to exhaust gas from the interior of the bubble 12 via the inlet ports 86 and conduit 80, to maintain the interior pressure of the film bubble 12 at a desired level.

To form the blown film bubble 12, the heated polymer melt is delivered from the polymer supply 14 to the die 16. As with the embodiment described with reference to FIG. 1, the polymer melt is extruded vertically from the die 16 as an initially cylindrical film. Simultaneously with the extrusion of the polymer melt from the die 16, the blower 36 is activated to force air streams through the primary air outlets 38,40. The blower 36 is operated with sufficient velocity to provide a high velocity cooling air flow. As a result, the forming bubble 12 initially attaches itself to the cooling air streams from the primary air outlets 38,40, which thereby initially draw the extruded film into the bubble 12 having the desired thickness. The cooling air from the primary air outlets 38,40 rapidly cools the film bubble 12 until the polymer cools and it stabilizes at the frost line 66, whereby the sides of the bubble cool sufficiently to become substantially non-expandable. As the polymer is continuously extruded, the cooling film bubble 12 moves vertically upward into the collapsing assembly 24, where the nip rollers 70,72 continuously flatten the bubble 12 and off feed the flattened film 73. Continuously with the extrusion of the polymer melt through the die 16 and the collapse and movement of the upper end of the bubble 12 through the nip rollers 70,72, the secondary stream of cooling air is forced into the bubble 12 via the blower 54, supply line 56 and conduit tube 74. As the cooling air moves outwardly from the outlet 76, the secondary air flow cools the upper portion of the blown film bubble 12 and displaces any stagnant warm air which may accumulate within the bubble near the nip rollers 70,72.

Concurrently with the introduction of cooling air into the film bubble by the secondary air outlets 76, the exhaust blower 82 is operated to draw air from the bubble interior outwardly via the exhaust inlet ports 86 and exhaust conduit 80. The rate at which cooling air is exhausted from the interior of the film bubble 12 is controlled by either the speed of the exhaust blower 82 and/or a damper valve 104 so as to maintain substantially an equilibrium between the cooling air injected into the blown film bubble 12 and the volume exhausted.

The preferred embodiment of the invention discloses the secondary cooling gas conduit 74 as comprising a cylindrical steel pipe. It is to be appreciated that other single or multiple configurations of pipes could also be used. The conduit 74 could equally be formed of aluminum, copper, polycarbonates and other plastics depending on the film to be extruded. Similarly, while the preferred embodiment of the invention illustrates a simplified secondary cooling gas conduit 74 which opens to a single outlet 76, the conduit 74 could be provided with any number of outlet nozzles either along part or all of its length. The outlet 76 could additionally be oriented to direct a stream of cooling gas directly towards the nip rollers 70,72 or obliquely thereto, so as to direct cooling gas towards the vertical sides of the film bubble 12.

The preferred embodiment of the invention discloses the secondary cooling gas outlet 76 as being located vertically between the roller conveyors 68 of the collapsing frame assembly 24. It is to be appreciated that the gas outlet 76 need not extend into the collapsing frame 24, and could equally be spaced at any number of different positions between the exhaust inlet ports 86 and the nip rollers 70,72, without departing from the spirit of the invention.

The detailed description of the preferred embodiment discloses the use of roller conveyors 68 and nip rollers 70,72 to collapse the bubble 12 and flatten the cooled film 73 for storage. It is to be appreciated that other collapsing apparatus could also be used. By way of one non-limiting example, it is possible that marginally spaced rollers with edge cutting knives could be provided in place of the nip rollers to split the film bubble 12 as it is cooled. Similarly, the roller conveyors 68 could equally be replaced by air pads having perforated air table-type skins to provide air flow and facilitate movement of the film 12 therepast.

Although the preferred embodiment of the invention describes the use of a spoke valve 88 and flapper valves 102,104 to control air flow through the conduit tube 74, and air conduits 58,80, the invention is not so limited. Other types of valves which either restrict air flow along the conduits or permit the introduction of atmospheric air are also possible. Air flow regulation could also be achieved by adjusting the speed of operation of the blowers.

The present invention has been described and illustrated with respect to a vertically aligned apparatus and process where the bubble 12 is continuously formed as a long stock bubble which moves upwardly in vertically elongated orientation into the collapsing assembly 24. If desired, the apparatus 10 of FIG. 1 could be inverted, whereby the formed bubble 12 moves vertically downward from the die 16, into a collapsing assembly 24 positioned directly therebelow. It is to be appreciated that the blown film bubble could also be formed having a horizontal or angular orientation without departing from the spirit and scope of the present invention.

The invention discloses the use of a polyethylene polymer resin as the melt material used to form the bubble 12. The present apparatus is equally suited to form blown films comprised of other materials including, for example, rubber, vinyl, nylon, other thermoplastics or other continuously blown film materials.

The secondary cooling gas conduit tube 74 is shown in FIGS. 1 and 2 as being mounted in a vertical orientation to the uppermost end of conduit 58. While this configuration provides a simplified construction, it is to be appreciated that the conduit tube 74 could equally extend through the center of die 16 as a separate cooling gas conduit, independent of the internal cooling ring assembly 32.

While the preferred embodiments of the invention disclose the provision of a secondary stream of cooling gas along the conduit tube 74 and from the outlet 76, the invention is not so limited. If desired, the secondary gas stream could equally comprise a warming gas stream used to warm and increase flexibility of the film bubble 12 immediately prior to it being nipped. It is envisioned that a warming air or other gas flow could be provided from the tube 74 and outlet 76 to increase the flexibility of thicker film bubbles 12 and reduce film wrinkling as the bubble 12 is collapsed and nipped.

Although the detailed description describes and illustrates preferred embodiments of the invention, it is to be understood that the invention is not so limited. Many modifications and variations will now become apparent to a person skilled in this art. For a more precise definition of the invention, reference may be had to the appended claims.

What is claimed is:

1. An apparatus for use in the continuous extrusion of a blown film comprising,
    a die suitable for forming a blown film bubble, said bubble characterized by a frost line separating an unstabilized portion of said bubble adjacent said die wherein said film remains in an expandable state, and a stabilized portion of said bubble wherein said film remains in a substantially non-expandable state,
    at least one first air outlet for directing a first stream of cooling air towards a surface of the film as said film emerges from the die,
    a collapsing assembly for collapsing the blown film bubble, said collapsing means positioned so as to be spaced from said frost line in a direction away from the die,
    an air exhaust for exhausting air from within the blown film bubble, the air exhaust including an exhaust inlet positioned for placement within said bubble at a location intermediate said frost line and said collapsing assembly,
    a second air outlet for providing a second stream of air into said stabilized portion of said blown film bubble at a location between said exhaust inlet and said collapsing assembly, said second air outlet being spaced from said frost line proximate to said collapsing assembly, whereby cooling airflow from the second air outlet displaces stagnant hot air accumulating within the stabilized portion of the film bubble, and
    an air supply for supplying air to said first air outlet and said second air outlet.

2. An apparatus as claimed in claim 1 wherein said collapsing assembly includes a collapsing roller assembly and nip rollers, said second air outlet being located substantially adjacent a portion of said collapsing roller assembly.

3. An apparatus as claimed in claim 1 wherein said at least one first air outlet is for directing said first stream of air toward an interior surface of the unstabilized portion of the bubble, said air supply supplying cooling air through said at least one first air outlet and said second air outlet at substantially the same rate as the air exhaust exhausts said air from the blown film bubble.

4. An apparatus as claimed in claim 3 further including, a third air outlet for providing a third stream of cooling air along an exterior surface of the unstabilized portion of the bubble as the film emerges from the die, and
    said air supply includes means to supply cooling air to the third air outlet.

5. An apparatus as claimed in claim 1 further including an air ring mounted vertically relative to said die, at least one said first air outlet being formed in said air ring and for directing said first stream of cooling air along an exterior surface of the unstabilized portion of the bubble, said air ring having a surface spaced from the path of travel of the film from the die contoured to guide the first stream of cooling air therealong.

6. An apparatus as claimed in claim 5 wherein said blown film bubble comprises a long stock bubble elongated in a vertical orientation, and said collapsing assembly is spaced vertically above said die and said air ring.

7. An apparatus as claimed in claim 1 wherein said blown film bubble comprises a long stock bubble which is extruded substantially vertically upward from said die, and said collapsing assembly is spaced vertically above said die.

8. An apparatus as claimed in claim 1 further including control valving for independently controlling air flow to each of said first and second air outlets.

9. An apparatus for use in the continuous extrusion of blown films comprising,
    a die suitable for forming a vertically elongated blown film bubble,
    a collapsing apparatus spaced vertically from said die, the collapsing apparatus including at least one pair of nip rollers for collapsing and substantially flattening an uppermost end of the blown film bubble, a primary gas outlet for directing a first stream of cooling gas toward a surface of the blown film as it emerges from the die, a secondary gas outlet spaced vertically from the primary gas outlet for providing a secondary stream of gas into an upper portion of the blown film bubble, a gas exhaust apparatus for exhausting gas from within the blown film bubble, the gas exhaust apparatus including an exhaust inlet positioned within said blown film bubble spaced vertically at a location above a frost line of the bubble where the blown film bubble stabilizes and said film remains in a substantially non-expandable state and below the secondary gas outlet, and wherein said secondary gas outlet is spaced adjacent to the collapsing apparatus, and the exhaust inlet is positioned marginally above the frost line of the blown film bubble.

10. An apparatus as claimed in claim 9 wherein said secondary stream of gas comprises cooling gas, said apparatus further including valving for independently regulating the flow of said cooling gas outwardly from the primary gas outlet and the secondary gas outlet.

11. An apparatus as claimed in claim 9 wherein said first gas outlet directs said first stream of cooling gas along an interior surface of the blown film bubble, said apparatus further including a third gas outlet for directing a third stream of cooling gas along an exterior surface of the blown film bubble.

12. An apparatus as claimed in claim 11 wherein said cooling gas is selected from the group consisting of air, oxygen, nitrogen, helium, neon and argon.

13. An apparatus as claimed in claim 3 wherein said air supply includes;

a blower, an air conduit providing gaseous communication between said blower and said first and second air outlets, and valving for regulating the flow of cooling air through at least part of the air conduit.

14. An apparatus as claimed in claim 10 wherein said cooling gas is selected from the group consisting of air, oxygen, nitrogen, helium, neon and argon.

15. An apparatus for use in the continuous extrusion of blown films comprising, a die suitable for forming an elongated blown film bubble, a collapsing apparatus spaced from said die for collapsing a remote end of the blown film bubble which is spaced from said die, a primary gas outlet for directing a first stream of cooling gas toward a surface of the blown film as it emerges from the die, a secondary gas outlet positioned adjacent said collapsing apparatus for providing a secondary stream of gas into the remote end of blown film bubble, a gas exhaust apparatus for exhausting gas from within the blown film bubble, the gas exhaust apparatus including an exhaust inlet positioned within said blown film bubble spaced between the primary gas outlet and the secondary gas outlet.

* * * * *